United States Patent [19]

Schweikert

[11] 4,017,936
[45] Apr. 19, 1977

[54] WINDSHIELD WIPER ARRANGEMENT
[75] Inventor: Karl Schweikert, Buhl, Germany
[73] Assignee: Robert Bosch G.m.b.H., Stuttgart, Germany
[22] Filed: Sept. 11, 1975
[21] Appl. No.: 612,578
[30] Foreign Application Priority Data
 Oct. 5, 1974 Germany .......................... 2447640
[52] U.S. Cl. ............... 15/250.32; 72/379
[51] Int. Cl.² ..................... B60S 1/40
[58] Field of Search ...... 15/250.32, 250.35–250.42; 403/152, 163, 157; 113/116 F, 116 H; 72/379

[56] References Cited
UNITED STATES PATENTS 3,576,044  4/1971  Besnard .......................... 15/250.32
3,659,309  5/1972  Besnard .......................... 15/250.32

FOREIGN PATENTS OR APPLICATIONS 44,399      7/1956  Germany ......................... 15/250.32
1,123,579   2/1962  Germany ......................... 15/250.32
1,190,348   4/1965  Germany ......................... 15/250.32

Primary Examiner—Peter Feldman
Attorney, Agent, or Firm—Michael J. Striker

[57] ABSTRACT

A windshield wiper arrangement includes a wiper arm, a wiper blade, a U-shaped carrying arm having a front side for receiving the blade and an opposite rear wall, and a hinge-type joint formed on the rear wall for pivotally connecting the carrying arm to the wiper arm.

6 Claims, 5 Drawing Figures

WINDSHIELD WIPER ARRANGEMENT

BACKGROUND OF THE INVENTION

The present invention relates to a windshield wiper arrangement, and more particularly to an improved windshield wiper arrangement for use in automotive vehicles.

In the prior art, windshield wiper arrangements usually comprise a wiper arm and/or an intermediate arm which are mechanically linked and connected to a power unit for swinging movement back and forth across a windshield, a wiper blade which is essentially a rubber squeegee, and a carrying arm which receives and supports the wiper blade and which also is pivotally connected to the wiper arm.

One well-known windshield wiper construction connects an elongated U-shaped carrying arm with a wiper arm by means of a rivet. The rivet shaft is inserted through lateral openings provided in the sidewalls of the U-shaped carrying arm, and then the leading end of the rivet is peened over. The rivet-type connection, however, is not sufficiently secure, because the inner circumferential surface of the lateral openings is inadequate to prevent the rivet from rotating therein, especially after a period of use.

In order to make the connection between the arms more secure and safer to use, stepped rivets, i.e. rivets having portions of different diameters, have been employed in specially-designed openings in the sidewalls. However, such arrangements have only proven effective for short periods of use. Inevitably, the clamped connection at the sidewall between the shoulder of the stepped rivet and the head made after riveting loosens. This effect is worsened, of course, with continuous usage of the windshield wiper. A detached connection is further disadvantageous because it causes excessive chattering of the wiper blades against the windshield and because it exposes more surface area to be corroded. Moreover, the related expenses of making the stepped rivet and of providing different holes of different diameters in the sidewalls makes this prior-art arrangement too uneconomical.

Still another prior-art windshield wiper arrangement connects the wiper arm to the carrying arm by forming two sleeve-like attachments on the sidewalls of the carrying arm which project outwardly and normally of the elongation of the carrying arm. The wiper arm, however, must have two coupling members on both of its sides to surround the two sidewalls of the carrying arm and be inserted into the two sleeve-like attachments. Not only is such an arrangement unsightly and costly, but, in addition, it utilizes a great amount of space. It will be appreciated that such an arrangement will interfere with the proper seating of the wiper blades.

Yet another prior-art arrangement tries to avoid this aforementioned disadvantage by aligning the two sleeve-like attachments formed on the two sidewalls inwardly towards each other. However, in that case, the rear side of the carrying arm — i.e. the closed end of the U-shaped configuration — must be provided with a hole to permit accessability of the wiper arm to the connection. The presence of the hole, however, causes the further disadvantage that it weakens the rigidity of the carrying arm, and especially the stiffness and the strength of the sidewalls. In operation, such a prior-art arrangement is particularly prone to deformation since the wiper arm will transmit most of its energy to the weakest point of the carrying arm. The sleeve-like attachments not only frequently are deformed, but the coupling members on the wiper arms often become detached making the entire arrangement useless.

SUMMARY OF THE INVENTION

Accordingly, it is the general object of the present invention to overcome the disadvantages of the prior art.

More particularly, it is an object of the present invention to provide a windshield wiper arrangement which has an especially strong and undetachable connection between the wiper and the carrier arms.

Another object is to provide a pivotal connection joint which prevents chattering of the blade on the windshield.

A further object is to provide a connection joint which substantially reduces the effect of corrosion.

An additional object is to provide a carrier arm which is not prone to deformation during use.

Yet another object is to provide a carrier arm which will not interfere with the seating of the wiper blade.

Still a further object is to provide a windshield wiper arrangement which is economical and simple to manufacture.

In keeping with these objects and others which will become apparent hereinafter, one feature of the present invention is embodied in a carrying arm which has a front side for receiving a wiper blade and an opposite rear side. Hinge-type connecting means for pivotally connecting the carrying arm to a wiper arm are provided on the rear side of the carrying arm.

The feature of forming the hinge-type connecting means or joint on the rear wall achieves all of the aforementioned objectives and overcomes the disadvantages noted above in a simple but novel manner. Since the joint is integral with the rear wall, the connection cannot rotate as the rivet-type connection of the prior art. Thus, the connection is more secure and will provide unobjectionable and long use. At the same time, this particular construction of the invention also reduces the chattering noise of the wiper blades on the windshield and substantially reduces the damage caused by spontaneous corrosion.

It is believed that the forming of the joint on the rear wall is specially novel since those skilled in the art have considered the rear wall of the carrying arm as scrap, i.e., unusable for any purpose. Furthermore, by forming the joint into a generally cylindrical but circumferentially incomplete configuration having an axis which is transverse to the elongation of the carrying arm, the joint actually serves to stiffen and increase the rigidity of the two sidewalls. The simple and uncomplicated construction of the joint on the rear wall eliminates the necessity to provide special openings therein which lead to a weakening of the inherent strength of the carrying arm of the prior art. The special openings which permit accessibility for the coupling members of the wiper arm are not needed, because the joint itself is situated in the plane of the rear wall. As noted above, the placement of the joint intermediate with and connected at both of its ends with the two sidewalls of the carrying arm assures safety in operation and an improved wiping action since the strength of the carrying arm is constantly being reinforced by the joint itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
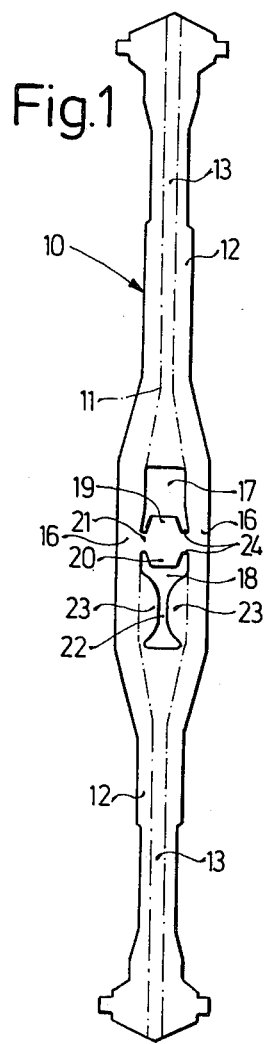
FIG. 1 is a rear view of a planar material blank prior to bending into a carrying arm.

Discussing the apparatus and the method which have been illustrated in an exemplary embodiment in FIGS. 1–5, it will be seen that reference numeral 10 generally identifies a carrying arm. A wiper blade and a wiper arm and/or an intermediate arm mechanically interconnecting the wiper arm to the carrying arm have not been illustrated for the sake of clarity and since they are conventional in the art. It should be understood that the term wiper arm as used throughout the specification and the claims is intended to encompass the primary wiper arm which is directly connected to a power unit and also any intermediate arm or arms linking the primary wiper arm to the carrying arm.

Figure 2:
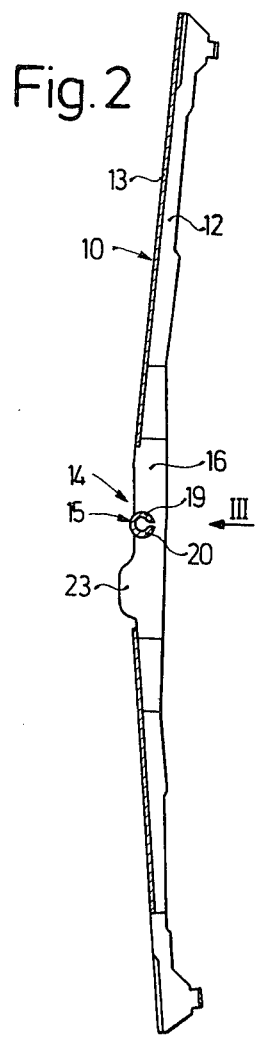
FIG. 2 is a longitudinal, cross-sectional view of the carrying arm after bending has occurred.
Figure 3:
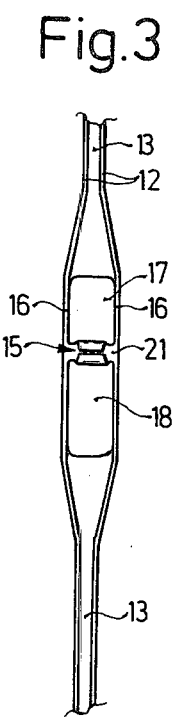
FIG. 3 is a side view of the carrying arm in the direction along the arrow III.
Figure 4:
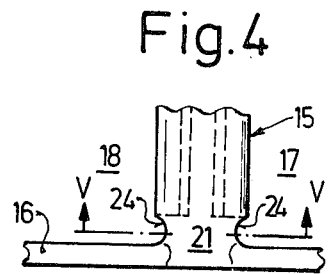
FIG. 4 is an enlarged, broken-away side view of the joint according to a preferred embodiment of the present invention.

In FIG. 1, a planar material blank is illustrated which, upon bending, will form the carrying arm 10. Bending lines 11 are shown using dot-dash lines which extend along the lengthwise elongation of the planar material blank. After bending the planar material blank along the bending lines 11 in a backward direction, i.e. into the plane of FIG. 1, an elongated, symmetrical U-shaped carrying arm 10, as shown in FIG. 2, is formed having two sidewalls 12 and a rear wall 13.

In the middle region 14 on the rear wall 13, hinge-type connecting means or joint 15 of generally cylindrical but circumferentially incomplete configuration is provided intermediate the two sidewalls 12, and more specifically between the sidewall portions 16 located in the middle region 14. The joint 15 is integrally connected with both sidewall portions 16 and has an axis which is transverse to the elongation of the carrying arm 10.

In order to form the joint 15, one approach utilizes at least one projection or tongue 19 which may be formed by providing a slit in the rear wall 13 and rolling the tongue 19 about the aforementioned transverse axis. Alternatively, an opening 17 may be provided, by stamping or like machining operations, in the rear wall 13 which is fashioned to surround three sides of the projecting tongue 19. The tongue 19 will then be rolled about the transverse axis, as before.

Another approach utilizes an additional projection or tongue 20 which may be formed by providing a slit in the rear wall 13 in a manner as described above, or by providing an opening 18 therein. In this case, the tongues 19 and 20 will both be rolled about their respective transverse axes and form the joint 15, as shown in FIG. 2. The tongues 19 and 20, which before bending, extend in mutually opposite directions along the elongation of the carrying arm 10, are connected by short straps 21 with the sidewall portions 16.

It is further advantageous if one of the openings, for example opening 18, is fashioned so that guide members 23 are formed by the constriction 22. The guide members 23, which originally face each other, are bent out of their common plane and elevated so that they project normally of the rear wall 13 and substantially parallel to the sidewalls 12 shown in FIG. 2. The guide members 23 will serve to support the non-illustrated wiper arm.

The rear wall 13 is formed with rounded corners or notches 24 at opposite axial ends of the joint 15 so that no cracks or splits will occur upon rolling the tongues 19 and 20, thus preventing the so-called notch effect. This detail of the arrangement is shown in an enlarged view in FIG. 4.

Figure 5:
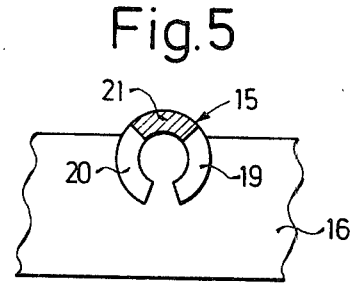
FIG. 5 is an enlarged, broken-away view showing a detail of FIG. 4 along the line V—V.

FIGS. 2 and 5 show the sleeve-type joint 15 which is to be connected with the non-illustrated wiper arm, and the outer cylindrical contour of the joint 15 largely resembles the outer contour of a rivet. The opening 18 is clearly shown in FIG. 3 of the drawing to be larger than the opening 17 so as to accommodate large-size wiper arms. The pivotal connection between the wiper arm having a hook-shaped end portion and the joint 15 is entirely conventional in the art and is believed not to require any discussion. An auxiliary member, such as a lining, may be situated between the hook-shaped end portion and the joint 15 to improve the connection.

The danger that deformation or creases will occur in the region between the tongues 19 and 20 and the sidewall portions 16, upon rolling the joint 15, are substantially reduced by forming the openings 17 and 18 so that they surround each of the tongues 19 and 20 on three sides. Furthermore, the radial corners 24 serve to eliminate the danger of deformation even further.

In summary, the hinged-joint 15 is situated as near as possible to the windshield so as to urge the blade affirmatively and uniformly across the windshield during the operation of the windshield wiper arrangement. The metallic carrying arm 10 is relatively stronger and less prone to detachment as compared with the prior-art arrangements. The relative cost of construction of the carrying arm of the present invention is not increased over the prior art since the tools used in rolling the tongues are commonly available.

It will be understood that each of the elements described above, or two or more together, may also find a useful application in other types of constructions differing from the types described above.

While the invention has been illustrated and described as embodied in a windshield wiper arrangement and method of making the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windshield wiper carrier arm which is adapted to be connected to a wiper arm, comprising a channel-shaped body having two spaced side walls and a transverse rear wall extending between said side walls; and means for pivotally connecting said channel-shaped body to a wiper arm, including two integral tongues forming portions of said transverse rear wall and being bent from the plane of said rear wall to form a tubular pivot which extends between said walls and is adapted for engagement with the wiper arm.

2. A windshield-wiper carrier arm as defined in claim 1, wherein said body is elongated; and wherein said pivot is of generally cylindrical but circumferentially incomplete configuration.

3. A windshield-wiper carrier arm as defined in claim 1; and further comprising additional portions of said rear wall bounding at least one opening on said rear wall adjacent said pivot.

4. A windshield-wiper carrier arm as defined in claim 3; wherein said one opening bounded by said additional portions of said rear wall extends between said spaced side walls.

5. A windshield-wiper carrier arm as defined in claim 3, wherein said additional portions of said rear wall include a pair of rounded corners, each respectively located at opposite ends of said pivot.

6. A windshield-wiper carrier arm as defined in claim 1, wherein said pivot is of one piece with said side walls.

* * * * *